United States Patent
Ramesh et al.

(12)

(10) Patent No.: US 6,900,283 B2
(45) Date of Patent: May 31, 2005

(54) METHOD FOR MAKING STABLE, HOMOGENEOUS MELT SOLUTIONS

(75) Inventors: Narayan Ramesh, Niskayuna, NY (US); Patrick Joseph McCloskey, Watervliet, NY (US); Kathryn Lynn Longley, Saratoga Springs, NY (US)

(73) Assignee: General Electric Company, Niskayuna, NY (US)

( * ) Notice: Subject to any disclaimer, the term of this patent is extended or adjusted under 35 U.S.C. 154(b) by 125 days.

(21) Appl. No.: 10/286,165

(22) Filed: Nov. 4, 2002

(65) Prior Publication Data

US 2004/0087756 A1 May 6, 2004

(51) Int. Cl.$^7$ .............................................. C08G 64/00
(52) U.S. Cl. ...................... 528/196; 502/164; 528/198
(58) Field of Search .......................... 502/164; 528/196, 528/198

(56) References Cited

U.S. PATENT DOCUMENTS 5,717,057 A * 2/1998 Sakashita et al. ........... 528/198

FOREIGN PATENT DOCUMENTS

| EP | 0673959 | 9/1995 |
|----|---------|--------|
| EP | 0703262 | 3/1996 |
| WO | WO0138418 | 5/2001 |

OTHER PUBLICATIONS

Copending U.S. patent application Ser. No. 10/167901, filed Jun. 12, 2002, of Patrick J. McCloskey et al. entitled "Method of Making an Aromatic Polycarbonate".
PCT Search Report.

* cited by examiner

*Primary Examiner*—Terressa Boykin
(74) *Attorney, Agent, or Firm*—Andrew J. Caruso; Patrick K. Patnode

(57) ABSTRACT

Stable, homogeneous melt solutions are prepared at temperatures of 200° C. or less from solid mixtures comprising at least one diaryl carbonate, at least one high melting dihydroxy aromatic compound (mp>200° C.), a transesterification catalyst, and optionally a lower melting dihydroxy aromatic compound. Thus, a stable, homogeneous melt solution is obtained from a solid mixture comprising 4,4'-biphenol (mp 282–284° C.) at a temperature of about 200° C. using either diphenyl carbonate or bis(methyl salicyl) carbonate as the diaryl carbonate component. It is shown that formation of the stable, homogeneous melt solutions requires the presence of the transesterification catalyst when substantial amounts of the high melting dihydroxy aromatic compound are present in the initial solid mixture. Solid mixtures comprising a variety of high melting bisphenols; 4,4'-biphenol; 3,3,3',3'-tetramethylspirobiindanbisphenol, and 4,4'-sulfonyidiphenol are converted to stable, homogeneous melt solutions at 200° C., a temperature substantially below the melting points of the high melting bisphenols in their pure states.

32 Claims, No Drawings

METHOD FOR MAKING STABLE, HOMOGENEOUS MELT SOLUTIONS

BACKGROUND OF THE INVENTION

This invention relates to the preparation of stable, homogeneous melt solutions useful for the preparation of homopolycarbonates and copolycarbonates.

Polycarbonates are widely used, relatively low cost thermoplastics esteemed for their combination of clarity, toughness, heat resistance and moldability. The most widely used polycarbonate is bisphenol A polycarbonate, hundreds of millions of pounds of which are manufactured and sold annually on a world wide basis.

Polycarbonates, both homopolycarbonates and copolycarbonates, are advantageously prepared in the absence of a solvent in what is sometimes referred to as the "melt process" in which a diaryl carbonate and one or more bisphenols are heated in a molten state in the presence of a transesterification catalyst. This melt method offers certain advantages over the widely used interfacial method of polycarbonate preparation which employs a solvent, typically methylene chloride. Methylene chloride is a low boiling chlorinated hydrocarbon and its use necessitates costly engineering measures to prevent its adventitious introduction into the environment. The melt process as a general proposition is less demanding with respect to controlling emissions since no solvent is involved and the only major volatile by-product produced, phenol, is quite high boiling (bp 182° C.) and is thus less difficult to contain using ordinary engineering means, such as water cooled condensers. The melt process suffers several disadvantages however, chief among them is the need to heat the reactants to relatively high temperatures 250–320° C. under low pressure, about 180 to about 0.1 mbar. The use of high temperatures is nearly always accompanied by unwanted side reactions which take place during the polymerization reaction. Most notable among unwanted side reactions taking place in the melt process is the Fries reaction. The presence of Fries reaction products in the product polycarbonate may negatively impact the color, stability and flow properties of the product polycarbonate.

In certain instances when preparing polycarbonates by the melt method it is found convenient to prepare a molten mixture of the reactants used in the melt process, a diaryl carbonate and a dihydroxy aromatic compound, which is then introduced by gravity flow or through a pump capable of pumping fluids into a melt reactor or series of melt reactors. This presents few difficulties when the diaryl carbonate and dihydroxy aromatic compound have low melting points, but may present serious engineering challenges where the melting point of the either the diaryl carbonate or the dihydroxy aromatic compound is in excess of 200° C. Where a mixture of diaryl carbonate and dihydroxy aromatic compound comprises a high melting bisphenol, for example 4,4'-biphenol, it is frequently difficult to achieve a homogeneous melt for use as a feedstock in the melt polymerization reaction. It would be highly desirable to discover a means of producing stable, homogeneous melt solutions from mixtures of diaryl carbonates and high melting dihydroxy aromatic compounds which are stable with respect to resolidification of the melt solution and with respect to precipitation of individual components comprising the melt solution. Moreover it would be highly desirable to discover a means of producing stable, homogeneous melt solutions from mixtures of diaryl carbonates and dihydroxy aromatic compounds having melting points in excess of 200° C., at temperatures substantially below the melting points of the highest melting constituent dihydroxy aromatic compound.

BRIEF SUMMARY OF THE INVENTION

The present invention provides a method of forming a stable, homogeneous melt solution, said method comprising:

(a) preparing a mixture comprising at least one diaryl carbonate, at least one first dihydroxy aromatic compound having a melting point of greater than 200° C., a catalytically effective amount of at least one transesterification catalyst, and optionally one or more second dihydroxy aromatic compounds having a melting point less than 200° C., said mixture having a total number of moles of said first and second dihydroxy aromatic compounds combined; and (b) heating said mixture at a temperature of 200° C. or lower to provide a stable, homogeneous melt solution.

In a further aspect the present invention relates to the use of stable, homogeneous melt solutions in the preparation of copolycarbonates.

DETAILED DESCRIPTION OF THE INVENTION

The present invention may be understood more readily by reference to the following detailed description of preferred embodiments of the invention and the examples included therein. In the following specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "copolycarbonate" refers to polycarbonates incorporating structural units derived from at least two dihydroxy aromatic compounds and includes copolycarbonates and polyester carbonates.

"BPA" is herein defined as bisphenol A or 2,2bis(4-hydroxyphenyl)propane.

As used herein, the term "copolycarbonate of bisphenol A" refers to a copolycarbonate comprising repeat units derived from BPA and at least one other dihydroxy aromatic compound.

As used herein, the term "melt polycarbonate" refers to a polycarbonate made by a method comprising transesterification of at least one diaryl carbonate with at least one dihydroxy aromatic compound.

"Catalyst system" as used herein refers to a catalyst or catalysts that catalyze the transesterification reaction of a dihydroxy aromatic compound with a diaryl carbonate in the preparation of melt polycarbonate.

"Catalytically effective amount" refers to an amount of a catalyst at which catalytic performance is exhibited.

As used herein the term "dihydroxy aromatic compound" means an aromatic compound which comprises two hydroxy groups, for example a bisphenol such as bisphenol A, or a dihydroxy benzene such as resorcinol.

As used herein the term "hydroxy aromatic compound" means a phenolic compound, such as phenol or p-cresol comprising a single reactive hydroxy group.

As used herein the term "aliphatic radical" refers to a radical having a valence of at least one comprising a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like. The carbonyl group of 4,4'dihydroxybenzophenone is an aliphatic radical having a valence of two.

As used herein the term "aromatic radical" refers to a radical having a valence of at least one comprising at least one aromatic group. Examples of aromatic radicals include phenyl, pyridyl, furanyl, thienyl, naphthyl, phenylene, and biphenyl. The term includes groups containing both aromatic and aliphatic components, for example a benzyl group. The structural unit derived from phathalic anhydride in fluorescein is defined herein as an aromatic radical having a valence of two.

As used herein the term "cycloaliphatic radical" refers to a radical having a valance of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclopropyl, cyclopentyl cyclohexyl, tetrahydrofuranyl and the like.

As mentioned, the present invention provides a method for preparing a stable, homogeneous melt solution, said method comprising:

(a) preparing a mixture comprising at least one diaryl carbonate, at least one first dihydroxy aromatic compound having a melting point of greater than 200° C., a catalytically effective amount of at least one transesterification catalyst, and optionally one or more second dihydroxy aromatic compounds having a melting point less than 200° C., said mixture having a total number of moles of said first and second dihydroxy aromatic compounds combined; and (b) heating said mixture at a temperature of 200° C. or lower to provide a stable, homogeneous melt solution.

Means for preparing the mixture comprising the diaryl carbonate, the first dihydroxy aromatic compound, the transesterification catalyst, and optionally the second dihydroxy aromatic compound are not particularly limited. The mixture can be prepared in a batchwise mixing process, for example mixing in a in a Henschel mixer, or in a continuous process, as for example where the components of the mixture are continuously fed to a first heated continuous stirred tank reactor (CSTR) to afford a partially molten mixture which is continuously fed to one or more downstream CSTR's wherein the formation of the stable, homogeneous melt solution is completed. In one embodiment, the partially molten mixture is continuously fed to a second CSTR the output of which is continuously presented to a third CSTR.

Alternatively the mixture comprising the diaryl carbonate, the first dihydroxy aromatic compound, the transesterification catalyst, and optionally the second dihydroxy aromatic compound is prepared and heated in the same apparatus, as in, for example, a twin screw extruder being operated at a temperature of less than 200° C. into which the first and second dihydroxy aromatic compounds, the transesterification catalyst, and the diaryl carbonate are introduced as solids via the throat of the extruder, the product stable, homogeneous melt solution emerging from the dieface of the extruder after a total residence time within the extruder of about one minute.

The stable, homogeneous melt solution itself is the product of chemical reaction between the components of the initially formed mixture comprising at least one first dihydroxy aromatic compound having a melting point of greater than 200° C., at least one diaryl carbonate, a catalytically effective amount of at least one transesterification catalyst, and optionally one or more second dihydroxy aromatic compounds having a melting point of less than 200° C. Basic thermodynamics instructs that this product of chemical reaction between the diaryl carbonate, and the first and second dihydroxy aromatic compounds mediated by the transesterification catalyst may be either a product of "partial" or "complete" reaction between the components of the mixture. Where the stable, homogeneous melt solution is the product of "complete" reaction between the components of the mixture it is said to be "fully equilibrated" meaning that for a given temperature no further change in the composition of the melt solution will occur regardless of how long it is heated. The composition of a fully equilibrated homogeneous melt solution is the equilibrium composition and is stable with respect to further changes in the composition of the melt solution. For example, at 200° C. a fully equilibrated melt solution prepared from I mole of diphenyl carbonate, 0.2 moles of 4,4'-biphenol (melting point (mp) 282–294° C.), and $1\times10^{-5}$ moles of tetrabutylphosphonium acetate comprises unreacted diphenyl carbonate, phenol by-product, and the bisphenyl carbonate of 4,4'-biphenol as well as other chemical reaction products, the relative amounts of said unreacted diphenyl carbonate, said phenol by-product, said bisphenyl carbonate of 4,4'-biphenol and said other chemical reaction products remaining constant over time. The relative amounts of the various products and starting materials present in a fully equilibrated melt solution are dependent upon the temperature of the melt solution. As a general proposition, equilibrium constants and with them compositions at equilibrium are dependent upon temperature. As noted, a fully equilibrated melt solution at a given temperature prepared according to the method of the present invention is stable with respect to changes in its composition because it is at equilibrium, but it is also stable with respect to resolidification of the melt solution or precipitation of individual components from the melt solution.

In some embodiments the stable, homogeneous melt solution is the product of incomplete chemical reaction between the components of the mixture. In such instances the melt solution at a given temperature is still subject to changes in composition because the rates of chemical reactions which are transformative are higher than the rates of chemical reactions which are restorative. At equilibrium of course the rates are equal. An example of a "transformative" chemical reaction is the reaction of diphenyl carbonate with 4,4'-biphenol to form the monophenyl carbonate of 4,4'-biphenol and phenol by-product. The corresponding "restorative" chemical reaction is simply the reverse process, namely the reaction of the by-product phenol with the monophenyl carbonate of 4,4'-biphenol to produce diphenyl carbonate and 4,4'-biphenol. When the stable, homogeneous melt solution prepared by the method of the present invention is not fully equilibrated, the melt solution is "stable" with respect to resolidification of the melt solution or precipitation of individual components from the melt solution. As noted above, it is not stable with respect to changes in the composition of the melt solution as the underlying chemical reactions progress toward equilibrium.

The stable, homogeneous melt solutions prepared by the method of the present invention are termed "melt solutions"

because they are free flowing homogeneous liquids at temperatures below 200° C. Although termed "solutions", there are no exogenous solvents present. In certain instances, as in fully equilibrated systems in which the molar amounts of diaryl carbonate and first and second dihydroxy aromatic compounds are about equal, the system can be thought of as generating its own solvent, the by-product hydroxy aromatic compound. For example, suppose a stable, homogeneous melt solution prepared from 1.05 moles of diphenyl carbonate, 0.1 moles of 4,4'-biphenol, 0.9 moles of bisphenol A and $2.5 \times 10^{-4}$ moles of tetrabutylphosphonium acetate, and suppose further that the system is "fully equilibrated". Such a stable, homogeneous melt solution at about 200° C. may comprise up to about 40 percent by weight phenol, the by-product hydroxy aromatic compound, which acts as a solvent.

In embodiments of the present invention which include the use of a quaternary phosphonium salt as the transesterification catalyst, the stable, homogeneous melt solutions display enhanced stability with respect to changes in the color of the melt solution relative to melt solutions prepared using an alkali metal hydroxides, for example sodium hydroxide, as the transesterification catalyst. As used herein a "stable, homogeneous melt solution" is a melt solution which may or may not be at "fully reacted" but which is stable with respect to resolidification of the melt solution and precipitation of individual components from the melt solution.

Diary carbonates used according to the method of the present invention include diaryl carbonates having structure I

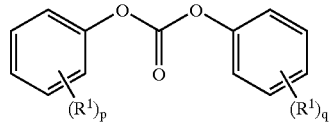

I wherein $R^1$ is independently at each occurrence a halogen atom, nitro group, cyano group, $C_1$–$C_{20}$ alkyl group, $C_1$–$C_{20}$ alkoxy carbonyl group, $C_4$–$C_{20}$ cycloalkyl group, or $C_6$–$C_{20}$ aryl group; and p and q are independently integers 0–5.

Diaryl carbonates exemplified by diphenyl carbonate, bis(4-methylphenyl) carbonate, bis(4-chlorophenyl) carbonate, bis(4-fluorophenyl) carbonate, bis(2-chlorophenyl) carbonate, bis(2-fluorophenyl) carbonate, bis(4-nitrophenyl) carbonate, bis(2-nitrophenyl) carbonate, bis(methyl salicyl) carbonate, and methyl salicyl phenyl carbonate.

The "First dihydroxy aromatic compound" used according to the method of the present invention has a melting point greater than 200° C., preferably in a range between about 205° C. and about 325° C. First dihydroxy aromatic compounds which may be used according to the method of the present invention include bisphenols having structure II

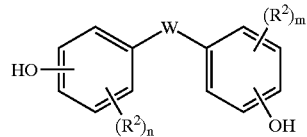

II wherein $R^2$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical, or the group

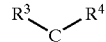

wherein $R^3$ and $R^4$ are independently a hydrogen atom, $C_1$–$C_{20}$ alkyl group, $C_4$–$C_{20}$ cycloalkyl group, or $C_4$–$C_{20}$ aryl group; or $R^3$ and $R^4$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups, or a combination thereof;

spirocyclic bisphenols having structure III

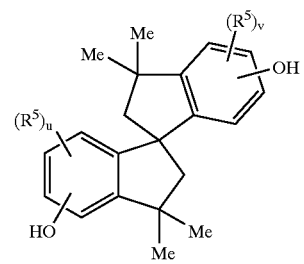

III wherein $R^5$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; u and v are independently integers 0–3; and binaphthols having structure IV

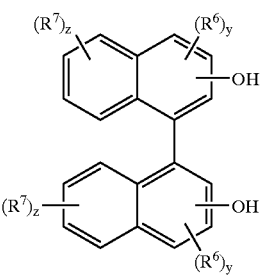

IV wherein $R^6$ and $R^7$ are independently at each occurrence a halogen atom, nitro group, cyano group, $C_1$–$C_{20}$ alkyl group, $C_4$–$C_{20}$ cycloalkyl group, or $C_6$–$C_{20}$ aryl group; y is independently an integer 0–3, and z is independently an integer 0–4.

Bisphenols having structure II are illustrated by 4,4'-biphenol; 4,4'-sulfonyldiphenol; 4,4'-sulfonylbis(2-methylphenol); 4,4'-dihydroxybenzophenone; fluorescein; and 4,4'-(9-fluorenylidene)diphenol.

Spirocyclic bisphenols having structure III are illustrated by 6,6'-dihydroxy-3,3,3',3'-tetramethylspirobiindane; 5,5'-difluoro-6,6'-dihydroxy-3,3,3',3'-tetramethylspirobiindane; 6,6'-dihydroxy-3,3,3',3',5,5'-hexamethylspirobiindane; and 6,6'-dihydroxy-3,3,3',3'5,5,',7,7'-octamethylspirobiindane.

Binaphthols having structure IV are illustrated by 1,1'-bi-2-naphthol; (R)-(+)-1,1'-bi-2-naphthiol; and (S)-(−)-1,1'-bi-2-naphthol.

As noted, the mixture from which the stable, homogeneous melt solutions are prepared according to the method of the present invention may also comprise a "second dihydroxy aromatic compound" which may be any dihydroxy aromatic compound having a melting point less than 200° C. In one embodiment the optional second dihydroxy aromatic compound is a bisphenol having structure V

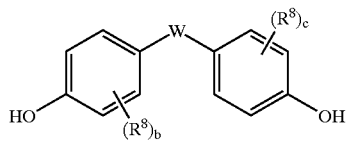

V wherein $R^8$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; b and c are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical, or the group

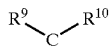

wherein $R^9$ and $R^{10}$ are independently a hydrogen atom, $C_1$–$C_{20}$ alkyl group, $C_4$–$C_{20}$ cycloalkyl group, or $C_4$–$C_{20}$ aryl group; or $R^9$ and $R^{10}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups, or a combination thereof.

Bisphenols having structure V are illustrated by bisphenol A; 2,2-bis(4-hydroxy-3-methylphenyl)propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl)cyclohexane; 1,1-bis(4-hydroxy-3-methylphenyl)cyclohexane; and 1,1-bis(4-hydroxyphenyl)-3,3,5-trimethylcyclohexane. Bisphenol A is frequently preferred.

The transesterification catalyst used according to the method of the present invention may be any catalyst capable of effectively catalyzing the transesterification reaction between a dihydroxy aromatic compound and a diaryl carbonate. Transesterification catalysts which may be used advantageously according to the method of the present invention include quaternary ammonium compounds, quaternary phosphonium compounds, or mixtures thereof. Quaternary ammonium compounds, quaternary phosphonium compounds, and mixtures thereof, may be used in combination with other transesterification catalysts such as metal hydroxides such as sodium hydroxide, salts of carboxylic acids such as sodium acetate, salts of sulfonic acids such as sodium methane sulfonate, salts of nonvolatile acids such as dipotassium hydrogenphosphate ($K_2HPO_4$), and salts of mixed alkali metal phosphates such as $CsNaHPO_4$. In some instances it is preferred to limit the transesterification catalyst to a single quaternary phosphonium compound such as tetrabutyphosphonium acetate.

In one embodiment of the present invention the transesterification catalyst comprises a quaternary ammonium compound having structure VI

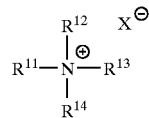

VI wherein $R^{11}$–$R^{14}$ are independently a $C_1$–$C_{20}$ aliphatic radical, $C_4$–$C_{20}$ cycloaliphatic radical, or a $C_4$–$C_{20}$ aromatic radical; and $X^-$ is an organic or inorganic anion. Typically, the anion is selected from the group consisting of hydroxide, halide, carboxylate, phenoxide, sulfonate, sulfate, carbonate, and bicarbonate ions.

Quaternary ammonium compounds having structure VI are illustrated by tetramethylammonium hydroxide, tetrabutylammonium hydroxide, and the like.

In one embodiment of the present invention the transesterification catalyst comprises a quaternary phosphonium compound having structure VII

VII wherein $R^{15}$–$R^{18}$ are independently a $C_1$–$C_{20}$ aliphatic radical, $C_4$–$C_{20}$ cycloaliphatic radical, or a $C_4$–$C_{20}$ aromatic radical; and $X^-$ is an organic or inorganic anion. Typically, the anion is selected from the group consisting of hydroxide, halide, carboxylate, phenoxide, sulfonate, sulfate, carbonate, and bicarbonate ions.

Quaternary phosphonium compounds having structure VII are illustrated by tetramethylphosphonium hydroxide, tetraphenylphosphonium hydroxide, tetraphenylphosphonium acetate, tetramethylphosphonium formate, tetrabutylphosphonium hydroxide, and tetrabutylphosphonium acetate. Tetraphenylphosphonium acetate and tetrabutylphosphonium acetate are frequently preferred.

Typically the amount of transesterification catalyst employed is in a range between about $1.0 \times 10^{-8}$ to about $1.0 \times 10^{-3}$, preferably between about $1.0 \times 10^{-6}$ to about $2.5 \times 10^{-4}$ moles of catalyst per mole of said first and second dihydroxy aromatic compounds combined. This means that the amount of catalyst is measured relative to the total number of moles of all of the dihydroxy aromatic compounds initially present in the mixture from which the stable, homogeneous melt solution is prepared. For example, suppose a mixture contains 2 moles of 4,4'-biphenol (the "first dihydroxy aromatic compound"), 5 moles of bisphenol A (the "second dihydroxy aromatic compound"), 7.5 moles of diphenyl carbonate, and a transesterification catalyst, tetraphenylphosphonium acetate. To achieve a catalyst level of between $1.0 \times 10^{-8}$ to about $1.0 \times 10^{-3}$ moles of catalyst per mole of the first and second dihydroxy aromatic compounds combined, tetraphenylphosphonium acetate would be added in an amount corresponding to between about $7.0 \times 10^{-8}$ to about $7.0 \times 10^{-3}$ moles of tetraphenylphosphonium acetate. Where the transesterification catalyst comprises two or more catalytic species, for example a mixture of tetraphenylphosphonium acetate and sodium hydroxide, the amount of transesterification catalyst meant by $1.0 \times 10^{-8}$ to about $1.0 \times 10^{-3}$ moles of catalyst per mole of first and second dihydroxy aromatic compounds combined means that the sum of the number of moles of each individual catalyst (moles $Ph_4POAc$+moles NaOH) divided by the sum of the number of moles of all of the dihydroxy aromatic compounds initially present in the mixture from which the stable, homogeneous melt solution is prepared is in a range between about $1.0 \times 10^{-8}$ to about $1.0 \times 10^{-3}$ moles of all catalysts per mole of all dihydroxy aromatic compounds initially present in said mixture.

The transesterification catalyst may comprise one or more alkali metal hydroxides, alkaline earth metal hydroxides, or mixture thereof. In one embodiment of the present invention the transesterification catalyst comprises at least one alkali metal hydroxide, or at least one alkaline earth metal hydroxide. Typically where the catalyst comprises a metal hydroxide said metal hydroxide is present in an amount corresponding to between about $1 \times 10^{-8}$ and about $1 \times 10^{-5}$ moles of metal hydroxide per mole of all dihydroxy aromatic compounds initially present in the mixture. Alkali metal hydroxides are illustrated by lithium hydroxide, sodium hydroxide and potassium hydroxide. Alkaline earth metal hydroxides are illustrated by calcium hydroxide and magnesium hydroxide.

The transesterification catalyst may comprise an alkali metal salt of a carboxylic acid, or an alkaline earth metal salt of a carboxylic acid, or a mixture thereof. In one embodiment of the present invention the transesterification catalyst comprises at least one alkali metal salt of a carboxylic acid, or at least one alkaline earth metal salt of a carboxylic acid. In one embodiment of the present invention the catalyst comprises $Na_2Mg$ EDTA, a salt of a tetracarboxylic acid (ethylene diamine tetracarboxylic acid) comprising both alkali metal ions (sodium ions) and an alkaline earth metal ion (magnesium ion).

The transesterification catalyst may comprise one or more salts of a non-volatile inorganic acid. In one embodiment of the present invention the catalyst comprises at least one salt of a non-volatile inorganic acid. Salts of non-volatile inorganic acids are illustrated by $NaH_2PO_3$, $NaH_2PO_4$, $Na_2HPO_3$, $KH_2PO_4$, $CsH_2PO_4$, and $Cs_2HPO_4$.

The transesterification catalyst may comprise one or more mixed alkali metal salts of phosphoric acid. Examples of mixed alkali metal salts of phosphoric acid include $NaKHPO_4$, $CsNaHPO_4$, and $CsKHPO_4$.

In one embodiment the stable, homogeneous melt solution prepared according to the method of the present invention is used to prepare a copolycarbonate. Thus, a stable homogeneous melt solution prepared by heating at a temperature of less than 200° C. a mixture comprising at least one diaryl carbonate, at least one first dihydroxy aromatic compound having a melting point of greater than 200° C., a catalytically effective amount of at least one transesterification catalyst, and at least one second dihydroxy aromatic compound having a melting point less than 200° C. is introduced into a first continuous stirred tank reactor operated at a temperature in a range between about 220–280° C. and a pressure in a range between 180 mbar and 20 mbar. The product emerging from the first continuous stirred tank reactor is an oligomeric copolycarbonate having a number average molecular weight, Mn, in a range between about 1000 and about 7500 daltons. In a second step, the oligomeric copolycarbonate is heated at a temperature in a range between about 280 and about 310° C. and a pressure in a range between about 15 mbar and about 0.1 mbar, to provide a product copolycarbonate having a number average molecular weight, Mn, in a range between about 8,000 daltons and about 50,000 daltons. In one embodiment of the present invention the product copolycarbonate comprises repeat units derived from 4,4'-biphenol and bisphenol A, the relative molar amounts of said repeat units being in a range from about 0.1 to 1 to about 10 to 1.

EXAMPLES

The following examples are set forth to provide those of ordinary skill in the art with a detailed description of how the methods claimed herein are evaluated, and are not intended to limit the scope of what the inventors regard as their invention. Unless indicated otherwise, parts are by weight, and temperature is in degrees centigrade (° C.).

Melt Solution Formation Examples 1–5

Stable, homogeneous melt solutions were prepared in a single neck, round-bottomed flask equipped with a magnetic stir bar. The flask was charged under ambient conditions with diaryl carbonate, a high melting bisphenol, tetrabutylphosphonium acetate catalyst, and optionally bisphenol A, in the molar ratios indicated in Table 1 and in amounts sufficient to produce a total weight of the stable, homogeneous melt solution of between about 5 and about 40 grams. The catalyst was added as a solution in water containing about 40 percent by weight tetrabutylphosphonium acetate (TBPA). The volume of the TBPA catalyst solution added was between about 5 and about 30 microliters. In each case the amount of catalyst employed corresponded to about $2.5 \times 10^{-4}$ moles of TBPA catalyst per mole of all bisphenols present in the mixture. The flask was then fitted with a standard vacuum adapter the stopcock of which was left in the open position. The interior of the flask was thus maintained at atmospheric pressure throughout the experiment. The flask was then lowered into an oil bath preheated to about 200° C. and the contents of the flask were observed over a period of about 10 minutes until a homogeneous melt solution was achieved. The melt solution was then stirred at about 200° C. for a period of about 1 hour in order to assess the stability of the melt solution. In each of Examples 1–5 the homogeneous melt solution remained unchanged.

Comparative Examples 1–12

A round-bottomed flask equipped as in Examples 1–5 was charged with the components indicated in Table 1 in amounts corresponding to the molar ratios given in Table 1 and such that the total weight of the contents of the flask was between about 5 and about 40 grams. The procedure followed was identical to that described for Examples 1–5. None of the mixtures prepared in Comparative Examples 1–12 achieved homogeneity after heating for 1 hour at 200–205° C.

The data gathered in Table 1 illustrate the invention. The data show that in the absence of additional components stable, homogeneous melt solutions of bisphenol and diphenyl carbonate can be achieved in the presence of a transesterification catalyst when the molar ratio of diphenyl carbonate to 4,4'-biphenol is about 2.22 (Example 1). Lower ratios of diphenyl carbonate to 4,4'-biphenol do not produce homogeneous melt solutions even on prolonged heating in a range from 200 to 205° C. In Comparative Examples 7 and 8 substantial amounts of a low melting additional component were added but no catalyst was included in the mixture. Comparative Examples 7 and 8 illustrate the requirement that a transesterification catalyst be present in order to achieve a homogeneous melt and the ineffectiveness of attempting to depress the melting point of the mixture comprising the high melting bisphenol by simply adding phenol. It is worth noting that the levels of phenol employed in Comparative Examples 7 and 8 are similar to the level of phenol expected in a fully equilibrated mixture of the 4,4'-biphenol and diphenyl carbonate. Thus, the attainment of a homogeneous melt solution at a temperature (200° C.)

substantially below the melting point of 4,4'-biphenol (282–284° C.) is shown to be dependent upon chemical reaction between the diaryl carbonate and the high melting bisphenol component.

TABLE 1

| Example | DAC$^a$ | High Melting Component and mp$^b$ | Additional Component$^c$ | Composition$^d$ (DAC/HMC)$^e$ | Homogeneous melt? |
|---|---|---|---|---|---|
| CE-1 | DPC | BP (282–4° C.) | none | 1.0/0.80 (1.25) | no |
| CE-2 | DPC | BP (282–4° C.) | none | 1.0/0.80 (1.25) | No$^f$ |
| CE-3 | DPC | BP (282–4° C.) | none | 1.0/0.97 (1.03) | no |
| CE-4 | DPC | BP (282–4° C.) | none | 1.0/0.97 (1.03) | No$^f$ |
| CE-5 | DPC | BP (282–4° C.) | none | 1.0/0.60 (1.67) | no |
| CE-6 | DPC | BP (282–4° C.) | none | 1.0/0.50 (2.0) | No$^g$ |
| 1 | DPC | BP (282–4° C.) | none | 1.0/0.45 (2.22) | Yes |
| CE-7 | DPC | BP (282–4° C.) | phenol | 1.0/0.50/2.02 (2.0) | No$^h$ |
| CE-8 | DPC | BP (282–4° C.) | phenol | 1.0/0.50/1.00 (2.0) | No$^h$ |
| CE-9 | BMSC | BP (282–4° C.) | none | 1.0/0.50 (2.0) | no |
| CE-10 | BMSC | BP (282–4° C.) | none | 1.0/0.40 (2.5) | no |
| CE-11 | BMSC | BP (282–4° C.) | none | 1.0/0.31 (3.22) | no |
| 2 | BMSC | BP (282–4° C.) | none | 1.0/0.22 (4.55) | Yes |
| CE-12 | BMSC | BP (282–4° C.) | BPA | 1.0/0.48/0.48 (2.08) | no |
| 3 | BMSC | BP (282–4° C.) | BPA | 1.0/0.388/0.60 (2.58) | Yes |
| 4 | BMSC | SBI (212–5° C.) | BPA | 1.0/0.483/0.483 (2.07) | Yes |
| 5 | BMSC | BPS (245–7° C.) | BPA | 1.0/0.483/0.483 (2.07) | Yes |

$^a$"DAC" = diaryl carbonate (diphenyl carbonate or BMSC)
$^b$"High Melting Component" is the indicated bisphenol having the melting point range given in parentheses, "BP" is 4,4'-biphenol, SBI is 6,6'-dihydroxy-3,3,3',3'-tetramethylspirobiindane, BPS is 4,4'-sulfonyldiphenol.
$^c$"Additional Component" when present was bisphenol A (BPA, mp 158–9° C.) or phenol (mp 40–2° C.).
$^d$Composition based on 1.0 mole diaryl carbonate.
$^e$Mole ratio of diaryl carbonate (DAC) to "High Melting Component" (HMC).
$^f$Experiment conducted at 205° C.
$^g$Mixture was judged to he nearly homogeneous after 1 hour at 200° C.
$^h$No catalyst was employed.

Example 2 and Comparative Examples 9–11 illustrate the preparation of a stable, homogeneous melt solution from a mixture of bis(methyl salicyl) carbonate (BMSC), 4,4'-biphenol, and a transesterification catalyst, TBPA. The data reveal that a stable, homogeneous melt solution can be achieved in this three component system, but a substantial amount of BMSC (4.55 molar equivalents relative to the high melting component, 4,4'-biphenol) is required. Example 3 reveals that this substantial excess of BMSC can be reduced if an additional component, in this instance BPA, is added to the mixture. Finally, Examples 4 and 5 illustrate the formation of stable, homogeneous melt solutions of mixtures comprising the bisphenols SBI (mp 212–215° C.) and BPS (mp 245–247° C.) respectively as the first dihydroxy aromatic compound, at a temperature substantially below the melting point of the high melting component bisphenol.

The invention has been described in detail with particular reference to preferred embodiments thereof, but it will be understood by those skilled in the art that variations and modifications can be effected within the spirit and scope of the invention.

What is claimed is:

1. A method of forming a stable, homogeneous melt solution, said method comprising:

(a) preparing a mixture comprising at least one diaryl carbonate, at least one first dihydroxy aromatic compound having a melting point of greater than 200° C., a catalytically effective amount of at least one transesterification catalyst, and optionally one or more second dihydroxy aromatic compounds having a melting point less than 200° C., said mixture having a total number of moles of said first and second dihydroxy aromatic compounds combined; and (b) heating said mixture at a temperature of 200° C. or lower to provide a stable, homogeneous melt solution.

2. A method according to claim 1 wherein said diaryl carbonate is selected from the group consisting of diaryl carbonates having structure I

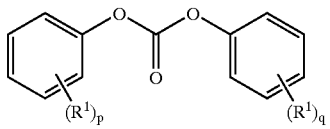

I wherein $R^1$ is independently at each occurrence a halogen atom, nitro group, cyano group, $C_1$–$C_{20}$ alkyl group, $C_1$–$C_{20}$ alkoxy carbonyl group, $C_4$–$C_{20}$ cycloalkyl group, or $C_6$–$C_{20}$ aryl group; and p and q are independently integers 0–5.

3. A method according to claim 2 wherein said diaryl carbonate is selected from the group consisting of diphenyl carbonate, bis(4-methylphenyl) carbonate, bis(4-chlorophenyl) carbonate, bis(4-fluorophenyl) carbonate, bis(2-chlorophenyl) carbonate, bis(2-fluorophenyl) carbonate, bis(4-nitrophenyl) carbonate, bis(2-nitrophenyl) carbonate, bis(methyl salicyl) carbonate, and methyl salicyl phenyl carbonate.

4. A method according to claim 1 wherein said first dihydroxy aromatic compound is a bisphenol having structure II

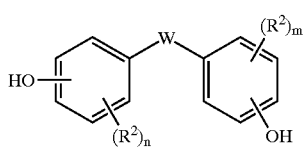

II wherein $R^2$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical, or the group

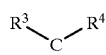

wherein $R^3$ and $R^4$ are independently a hydrogen atom, $C_1$–$C_{20}$ alkyl group, $C_4$–$C_{20}$ cycloalkyl group, or $C_4$–$C_{20}$ aryl group; or $R^3$ and $R^4$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups, or a combination thereof.

5. A method according to claim 4 wherein said bisphenol having structure II is selected from the group consisting of 4,4'-biphenol; 4,4'-sulfonyidiphenol; 4,4'-sulfonylbis(2-methylphenol); 4,4'-dihydroxybenzophenone; fluorescein; and 4,4'-(9-fluorenylidene)diphenol.

6. A method according to claim 1 wherein said first dihydroxy aromatic compound is a spirocyclic bisphenol having structure III

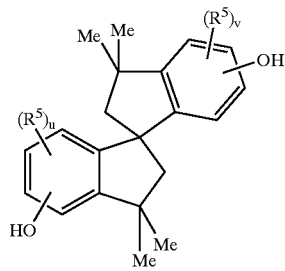

III wherein $R^5$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; and u and v are independently integers 0–3.

7. A method according to claim 6 wherein said spirocyclic bisphenol is selected from the group consisting of 6,6'-dihydroxy-3,3,3',3'-tetramethylspirobiindane; 5,5'-difluoro-6,6'-dihydroxy-3,3,3',3'-tetramethylspirobiindane; 6,6'-dihydroxy-3,3,3',3',5,5'-hexamethylspirobiindane; and 6,6'-dihydroxy-3,3,3',3',5,5,',7,7'-octamethylspirobiindane.

8. A method according to claim 1 wherein said dihydroxy aromatic compound is a binaphthol having structure IV

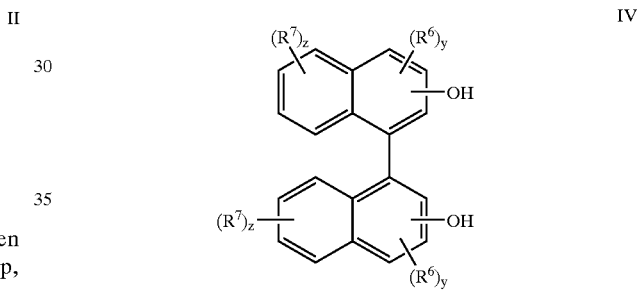

IV wherein $R^6$ and $R^7$ are independently at each occurrence a halogen atom, nitro group, cyano group, $C_1$–$C_{20}$ alkyl group, $C_4$–$C_{20}$ cycloalkyl group, or $C_6$–$C_{20}$ aryl group; y is independently an integer 0–3; and z is independently an integer 0–4.

9. A method according to claim 8 wherein said binaphthol is selected from the group consisting 1,1'-bi-2-naphthol; (R)-(+)-1,1'-bi-2-naphthol; and (S)-(−)-1,1'-bi-2-naphthol.

10. A method according to claim 1 wherein said second dihydroxy aromatic compound is a bisphenol having structure V

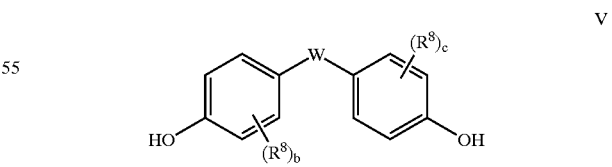

V wherein $R^8$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; b and c are independently integers 0–4; and W is a bond, an oxygen atom, a sulfur atom, a $SO_2$ group, a $C_1$–$C_{20}$ aliphatic radical, $C_6$–$C_{20}$ aromatic radical, a $C_6$–$C_{20}$ cycloaliphatic radical, or the group

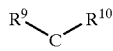

wherein $R^9$ and $R^{10}$ are independently a hydrogen atom, $C_1-C_{20}$ alkyl group, $C_4-C_{20}$ cycloalkyl group, or $C_4-C_{20}$ aryl group; or $R^9$ and $R^{10}$ together form a $C_4-C_{20}$ cycloaliphatic ring which is optionally substituted by one or more $C_1-C_{20}$ alkyl, $C_6-C_{20}$ aryl, $C_5-C_{21}$, aralkyl, $C_5-C_{20}$ cycloalkyl groups, or a combination thereof.

11. A method according to claim 10 wherein bisphenol having structure V is selected from the group consisting of bisphenol A; 2,2-bis(4-hydroxy-3-methylphenyl)propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl) cyclohexane; 1,1-bis(4-hydroxy-3-methylphenyl) cyclohexane; and 1,1-bis(4-hydroxyphenyl)-3,3,5-trimethylcyclohexane.

12. A method according to claim 1 wherein said transesterification catalyst comprises a quaternary ammonium compound, a quaternary phosphonium compound, or a mixture thereof.

13. A method according to claim 12 wherein said quaternary ammonium compound has structure VI

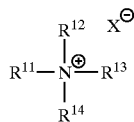

VI wherein $R^{11}-R^{14}$ are independently a $C_1-C_{20}$ aliphatic radical, $C_4-C_{20}$ cycloaliphatic radical, or a $C_4-C_{20}$ aromatic radical; and $X^-$ is an organic or inorganic anion.

14. A method according to claim 13 wherein said anion is selected from the group consisting of hydroxide, halide, carboxylate, phenoxide, sulfonate, sulfate, carbonate, and bicarbonate.

15. A method according to claim 14 wherein said quaternary ammonium compound is tetramethylammonium hydroxide.

16. A method according to claim 12 wherein said quaternary phosphonium compound has structure VII

VII $$\begin{array}{c} R^{16}\ \ X^{\ominus} \\ | \\ R^{15}-P^{\oplus}-R^{17} \\ | \\ R^{18} \end{array}$$

wherein $R^{15}-R^{18}$ are independently a $C_1-C_{20}$ aliphatic radical, $C_4-C_{20}$ cycloaliphatic radical, or a $C_4-C_{20}$ aromatic radical; and $X^-$ is an organic or inorganic anion.

17. A method according to claim 16 wherein said anion is selected from the group consisting of hydroxide, halide, carboxylate, phenoxide sulfonate, sulfate, carbonate, and bicarbonate.

18. A method according to claim 17 wherein said quaternary phosphonium compound is tetrabutylphosphonium acetate.

19. A method according to claim 1 wherein said transesterification catalyst is present in an amount equivalent to from about $1 \times 10^{-8}$ to about $1.0 \times 10^{-3}$ moles transesterification catalyst per mole of said first and second dihydroxy aromatic compounds combined.

20. A method according to claim 12 wherein said transesterification catalyst further comprises at least one alkali metal hydroxide, alkaline earth metal hydroxide, or mixture thereof.

21. A method according to claim 1 wherein said transesterification catalyst comprises at least one metal hydroxide selected from the group consisting of alkali metal hydroxides, alkaline earth metal hydroxides, and mixtures thereof.

22. A method according to claim 21 wherein the amount of said metal hydroxide is in a range between about $1 \times 10^{-8}$ and about $1 \times 10^{-5}$ moles per mole of said first and second dihydroxy aromatic compound combined.

23. A method according to claim 22 wherein said alkali metal hydroxide is sodium hydroxide, and said alkaline earth metal hydroxide is calcium hydroxide.

24. A method according to claim 1 wherein said transesterification catalyst comprises at least one alkali metal salt of a carboxylic acid, or an alkaline earth salt of a carboxylic acid, or a mixture thereof.

25. A method according to claim 24 wherein said salt of a carboxylic acid is $Na_2Mg$ EDTA.

26. A method according to claim 1 wherein said transesterification catalyst comprises at least one salt of a non-volatile inorganic acid.

27. A method according to claim 26 wherein said salt of a non-volatile acid is selected from the group consisting of $NaH_2PO_3$, $NaH_2PO_4$, $Na_2HPO_3$, $KH_2PO4$, $CsH_2PO_4$, and $Cs_2HPO_4$.

28. A method according to claim 26 wherein said salt of a non-volatile acid is a mixed alkali metal salt of phosphoric acid.

29. A method according to claim 28 wherein said mixed alkali metal salt of phosphoric acid is selected from the group consisting of $NaKHPO_4$, $CsNaHPO_4$, and $CsKHPO_4$.

30. A copolycarbonate prepared from the stable, homogeneous melt solution of claim 1.

31. A method of forming a stable, homogeneous melt solution, said method comprising:

(a) preparing a mixture comprising diphenyl carbonate, at least one first dihydroxy aromatic compound having a melting point of greater than 200° C., a catalytically effective amount of at least one transesterification catalyst, and bisphenol A; and (b) heating said mixture at a temperature of 200° C. or lower to provide a stable, homogeneous melt solution.

32. A method of forming a stable, homogeneous melt solution, said method comprising:

(a) preparing a mixture comprising bis(methyl salicyl) carbonate, at least one first dihydroxy aromatic compound having a melting point of greater than 200° C., a catalytically effective amount of at least one transesterification catalyst, and bisphenol A; and (b) heating said mixture at a temperature of 200° C. or lower to provide a stable, homogeneous melt solution.

* * * * *